(No Model.)

W. H. HOWE.
ROD FOR VIOLONCELLOS.

No. 515,831. Patented Mar. 6, 1894.

WITNESSES
Eva S. Rounds
Charles B. Crocker

INVENTOR
William H. Howe
by B. J. Noyes
Atty.

UNITED STATES PATENT OFFICE.

WILLIAM H. HOWE, OF WATERTOWN, MASSACHUSETTS.

ROD FOR VIOLONCELLOS.

SPECIFICATION forming part of Letters Patent No. 515,831, dated March 6, 1894.

Application filed June 2, 1893. Serial No. 476,319. (No model.)

*To all whom it may concern:*

Be it known that I, WILLIAM H. HOWE, of Watertown, county of Middlesex, State of Massachusetts, have invented an Improvement in Rods for Violoncellos, of which the following description, in connection with the accompanying drawings, is a specification, like letters on the drawings representing like parts.

This invention has for its object to provide novel means for securing the extension rod of a violoncello, and for clamping it in its different adjusted positions to regulate the height to which it is desired to raise the instrument from the floor.

In accordance with this invention the circumferentially grooved tail-gut block is provided upon its upper end with an externally screw threaded projection which is adapted to be screwed into a block seated in the usual supporting block at the lower end of the instrument which supports the component parts thereof; and is provided upon its lower end with an externally screw threaded projection, made tapering for a part or for the whole of its length, and slitted lengthwise to present several yielding parts. The tail-gut block together with its screw threaded projections above and below are bored longitudinally to provide a passage for the extension rod. An internally screw threaded nut is adapted to be screwed onto the projection at the lower end of the tail-gut block, the said nut being internally tapered for a portion or for the whole of its length so that when screwed onto the slitted projection, the yielding parts thereof, will be brought into engagement with the extension rod to hold it frictionally in whatever position it may be put.

Figure 1:
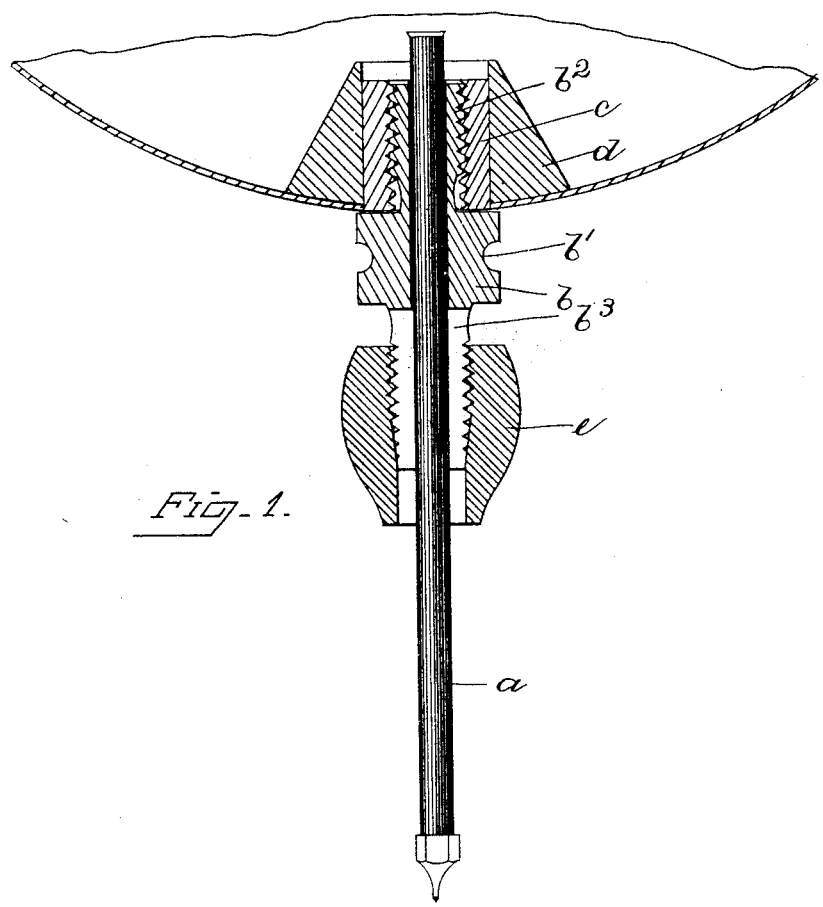
Figure 2:
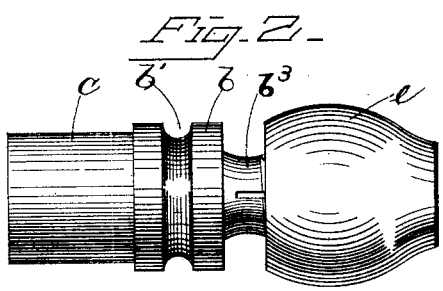
Figure 3:
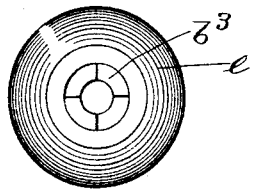

Figure 1, shows in vertical section the securing device for the extension rod of the violoncello embodying this invention. Fig. 2, shows in elevation the tail-gut block and connected parts removed from the instrument, the extension rod being also removed, and Fig. 3, a detail to be referred to.

The extension rod $a$ is of any suitable length, pointed at its lower end, and provided with a suitable enlargement, and upset at its upper end to present a head. The tail-gut block $b$, having a circumferential groove $b'$, is provided at its upper side or end with a projection $b^2$, externally screw threaded, and at its lower side or end with a projection $b^3$, also externally screw threaded. The extension $b^3$ is made tapering for a part or for the whole of its length and is slitted longitudinally to present several yielding parts, see Fig. 3, four being herein shown. The block $b$ and its projections $b^2$, $b^3$, are bored longitudinally to provide a suitable passage for the extension rod $a$, into which it freely slides. The projection $b^2$, is screwed into the block $c$, which is fitted into and secured to the supporting block $d$, to which the component parts of the instrument are connected. This construction provides a very strong bearing for the tail-gut block, that will withstand the undue strain to which it is subjected without yielding or working loose. A nut $e$ having an internally screw threaded bore, tapered for a part or for the whole of its length, is adapted to be turned onto the projection $b^3$, to draw the yielding parts thereof into engagement with the extension rod $a$, as said nut is turned on, thereby holding said rod frictionally in whatever position it may be placed.

All the parts herein shown with the exception of the rod $a$, are or may be made of wood. This construction of clamping device for the extension rod permits the parts to be made of wood, thereby avoiding metallic contact or connection which it is so desirable or necessary to avoid. The nut $e$ is made long enough so that the pointed end of the rod $a$, will be protected and concealed when in its abnormal or out-of-use position.

I claim—

1. The combination of the extension rod $a$ and circumferentially grooved tail-gut block $b$, externally screw threaded part $b^2$, projecting from the upper end of said block $b$, and externally screw threaded tapered and slitted part $b^3$, projecting from the lower end of said block $b$, block $c$, fitted into and secured to block $d$, of the instrument, and the nut $e$, having an internally screw-threaded tapered bore adapted to be turned onto the projection $b^3$, and thereby frictionally clamp the extension rod $a$, substantially as described.

2. The combination of the extension rod $a$, and tail-gut-block $b$, and means for securing it to the instrument, the externally screw threaded tapered and slitted part $b^3$ projecting from the lower end of said block $b$, and nut $e$, made of sufficient length to protect the point of the rod $a$, when in its abnormal position, substantially as described.

3. The tail-gut block $b$, and externally screw threaded part $b^2$, projecting therefrom, the block $c$, into which said part $b^2$ is turned, and the supporting block $d$, into which said block $c$, is seated, substantially as described.

In testimony whereof I have signed my name to this specification in the presence of two subscribing witnesses.

WILLIAM H. HOWE.

Witnesses:
B. J. NOYES,
EVA S. ROUNDS.